(12) United States Patent
Symmes

(10) Patent No.: US 7,725,822 B2
(45) Date of Patent: *May 25, 2010

(54) SYSTEM AND METHOD FOR TEACHING SPELLING

(75) Inventor: Chandler W. Symmes, Concord, NH (US)

(73) Assignee: Adelja Learning, Inc., Concord, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/139,581

(22) Filed: Jun. 16, 2008

(65) Prior Publication Data

US 2008/0280271 A1 Nov. 13, 2008

Related U.S. Application Data

(63) Continuation of application No. 11/283,366, filed on Nov. 18, 2005, now Pat. No. 7,401,293.

(60) Provisional application No. 60/629,435, filed on Nov. 19, 2004.

(51) Int. Cl.
*G06F 17/00* (2006.01)
*G09B 19/00* (2006.01)

(52) U.S. Cl. ..................................... 715/257; 434/118

(58) Field of Classification Search ................. 715/257; 434/118

See application file for complete search history.

(56) References Cited

U.S. PATENT DOCUMENTS 6,468,084 B1 * 10/2002 MacMillan ................. 434/185
6,676,412 B1 * 1/2004 Masterson et al. .......... 434/169
7,584,426 B2 * 9/2009 Chang et al. ................. 715/257
2002/0119429 A1 * 8/2002 Barton ........................ 434/178
2003/0028588 A1 * 2/2003 McConnell et al. ......... 709/203
2003/0101153 A1 * 5/2003 Francis et al. ................. 706/47
2004/0018479 A1 * 1/2004 Pritchard et al. ............ 434/350
2006/0063139 A1 * 3/2006 Carver et al. ................. 434/178

OTHER PUBLICATIONS

"iSpellWell", James M. Voelker, Voelker Software, Copyright 2000-2001, pp. 1-31.*
International Preliminary Report for PCT/US2005/042352, filed Mar. 10, 2009—WIPO.

\* cited by examiner

*Primary Examiner*—Laurie Ries
(74) *Attorney, Agent, or Firm*—Bourque & Associates, PA

(57) ABSTRACT

A computerized system and method of teaching spelling interfaces with an application that captures a user's misspelled words and adds them to a word database. A teacher or instructor may also add words to the word database based on a user's curriculum, cross-curriculum or words of interest. The words in the word database are utilized to automatically create an individualized spelling teaching assignment and spelling Journal for a user. The user corrects any spelling mistakes that he or she has made and performs assignments with new words including hearing the words pronounced, spelling the words and writing sentences using the words. Spelling tests are also assigned. The teacher or instructor monitors the completion of the various assignments by the students and also monitors how well the assignments are performed.

21 Claims, 8 Drawing Sheets

Review any lesson you want by choosing it from the list.

Quit SpellDoctor by clicking the Quit SpellDoctor button above.

SpellDoctor Message: You are working on Lesson 1. Click the Start button by an assignment to get started.

SPELLDOCTOR LESSON LIST [1 ▼]    VIEW MY SPELLING JOURNAL

| HERE ARE YOUR ASSIGNMENT(S) FOR THE CURRENT LESSON LESSON # 1 | | STATUS | START |
|---|---|---|---|
|  | Correct your misspelled words captured by the Word Logger and write sentences using each of those words. | Done 10/13/05 | REVIEW |
|  | Type the words in your assigned spelling list and write a sentence using each of them. | Done 10/13/05 | REVIEW |
|  | Practice spelling the words in your spelling test. These words include both your own errors and your assigned spelling words. | Done 10/13/05 | REVIEW |
|  | Take your spelling test. These are the same words in your practice exercise above. | Done 10/13/05 | REVIEW |

Fig. 5

STATUS WINDOW

Choose a Different Class

SpellDoctor ▼

⊕ Add New Words

✎ Edit Curriculum or Cross-Curriculum Sentences

🆔 Change Class Defaults

---

Teacher Columns:
Click an individual cell to work on that particular step for an individual student.

Student Columns:
These are displayed to show you a student's status. *Student columns are not clickable.*

SPECIAL NOTE:
Test Results Column: Click the icon at the top of this column to view overall test results for the entire class. Click a student cell to view his/her test results.

Keys to Teacher Columns:
To Do: You have a task to do for this student at this step. Click the words To Do to perform it.
Date: Completion date for this particular task. Click the date to review that task.
Waiting: No tasks need to be done for this step at this point. Waiting status is not clickable.

SpellDoctor

| STUDENTS | LESSON # | TEACHER Check-in words | STUDENT Spell words & write sentences | TEACHER Review words & sentences | STUDENT Practice & take test | TEACHER Review & accept test results | TEACHER: Review Student's Spelling Journal |
|---|---|---|---|---|---|---|---|
| Student1 | 4 | To Do | Waiting | Waiting | Waiting | Waiting | View |
| Student2 | 2 | To Do | Waiting | Waiting | Waiting | Waiting | View |
| Student3 | 2 | To Do | Waiting | Waiting | Waiting | Waiting | View |
| Student4 | 1 | To Do | Waiting | Waiting | Waiting | Waiting | View |
| Student5 | 1 | To Do | Waiting | Waiting | Waiting | Waiting | View |
| Student6 | 1 | To Do | Waiting | Waiting | Waiting | Waiting | View |

Fig. 7

SYSTEM AND METHOD FOR TEACHING SPELLING

CROSS-REFERENCE TO RELATED APPLICATIONS

This application is a continuation of U.S. patent application Ser. No. 11/283,366 filed Nov. 18, 2005 and fully incorporated herein by reference. This application also claims the benefit of U.S. provisional patent application No. 60/620,435 filed Nov. 19, 2004 and incorporated fully herein by reference.

TECHNICAL FIELD

The present invention relates to teaching systems and more particularly, to a system and method which interfaces with a local or remote spell checking program, for logging misspelled words and for using those misspelled words, along with possible instructor assigned words, to create a spelling journal and/or other spelling teaching tools.

BACKGROUND INFORMATION

Spell checking programs are well known. These programs work in conjunction with various computer-based programs such as word processors, e-mail programs, web page generation programs and the like, to provide built-in spell checking functions to assist the user in creating correctly spelled documents. Unfortunately, however, users and especially children or those for whom English (or other language) is a second language, have come to rely more and more on these programs with a corresponding decline in people's ability to correctly spell words. This is particularly true for students. Students would rather rely on spell checking to correct their errors than to learn how to properly spell words.

Computer programs that aim to teach students how to spell are also known. These programs, however, typically provide spelling lessons using "canned" words—that is, words that the program or teacher has chosen to present to the student. The words that are chosen to be taught to the student have no bearing or connection with the words that the student selects to use in his or her own writing.

Accordingly, a need exists for a system and method which will capture a user's misspelled words while a user is engaged in authentic writing, and allow those words to be used in a teaching application and/or in a spelling journal type of application whether alone, or with other words as directed by an instructor.

SUMMARY

The present invention features a system and method for teaching spelling to a user. The system maintains a word database having two inputs. A first input, from a word logger, originates from misspelled words generated from a user's authentic writing. Authentic writing, as used herein, is defined as writing in which the user chooses the words used in the writing, such as done by the user when using an application program such as a word processor, email program, spreadsheet or the like. The "word logger" portion of the present invention is a piece of software code located either on the user's computer or remotely on the network and serves to intercept and log the user's misspelled words and forwards them to the word database. A teacher, parent, instructor or the like may also insert words into the word database. The words may be arbitrary or may be related to some curriculum or cross-curriculum that the user is involved in.

The present invention provides two applications to access the words stored in the word database. The applications are preferably software code running locally on the user's computer, locally on the instructor's computer, or web based running or downloaded remotely over the internet. The first application is the student or user spelling journal application which allows the user to login to the system and see his or her misspelled words as well as words that are assigned to him or her by the teacher or instructor. Assignments are generated that the student must complete. The student must spell words correctly, create sentences using the words, perform exercises as assigned by instructor, and in some instances, hears the words pronounced by a text to speech engine utilized by the present invention.

The teacher's spelling interface allows the teacher to view the student or user's intercepted word data base, add said intercepted words to the student or user's assignment, add curriculum or Cross curriculum based words as well as sentences which show the proper use of the words in context. The teacher also checks on the completion of assignments by the students assigned to the teacher. In this way, the teacher can monitor the students' progress and proper completion of all spelling assignments.

The present invention features a method for providing words to be taught to a user using an automated computer program, comprising the acts of obtaining from a spelling checking computer program one or more words that a computer user has misspelled while engaged in the act of authentic writing, and in response to those one or more misspelled words, for creating at least one computerized teaching assignment to be accessed by the user, the teaching assignment for reinforcing proper spelling and usage of the one or more misspelled words. In one embodiment, the one or more words that a computer user has misspelled are stored in a word database. In another embodiment, a teacher, instructor or the like may add words to the database. In this embodiment, the user accesses not only misspelled words but also teacher stored words. A student assignment utilizing both types of words is generated for the user and must be completed by the student and reviewed by the teacher.

The present invention also features a system for providing a computerized spelling assignment including a word logger, which intercepts reports of misspelled words on a computer being used by an individual while engaged in the act of authentic writing. The misspelled words are ultimately stored in an individual's word database and used by a spelling journal application, to create a spelling assignment individualized for a given user. The present invention also features a spelling teaching application, which allows a teacher, parent or other similar instructor to add words to an individual's word database. The teacher added words are used by the spelling journal application to create spelling assignments based not only on misspelled words but also on teacher assigned words as well. The teacher monitors the progress of the completion of the assignments by the student as well as the appropriate and successful completion of the assignments.

The invention also contemplates that there may be provided one or more spelling strategies or rules which a teacher or instructor may assign to one or more particular students. The teacher of the system may assign particular words to one or more particular strategies or rules. The student assignment portion of the invention will check misspelled words to see if they are also in one or more of the rules or strategies and if so, the system can provide detailed written and/or verbal feedback concerning the particular rule and the fact that this particular misspelled word has already been covered by the rule or strategy.

In the preferred embodiment, the system utilizes Microsoft's MSagent software, a text to speech engine as well as one or more wizards to speak and pronounce words to the student and to repeat sentences to the student or user as well, although this is not a limitation of the present invention as any other text-to-speech engine now available or developed in the future may be used without departing from the scope of the present invention.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the allowed claims and their equivalents.

BRIEF DESCRIPTION OF THE DRAWINGS

These and other features and advantages of the present invention will be better understood by reading the following detailed description, taken together with the drawings wherein:

FIG. 5 is a representation of an exemplary student assignment lesson provided by the system and method according to the present invention;

FIG. 7 is a representation of exemplary teacher functions to be selected from the system and method of the present invention.

DETAILED DESCRIPTION OF THE PREFERRED EMBODIMENTS

Figure 1:
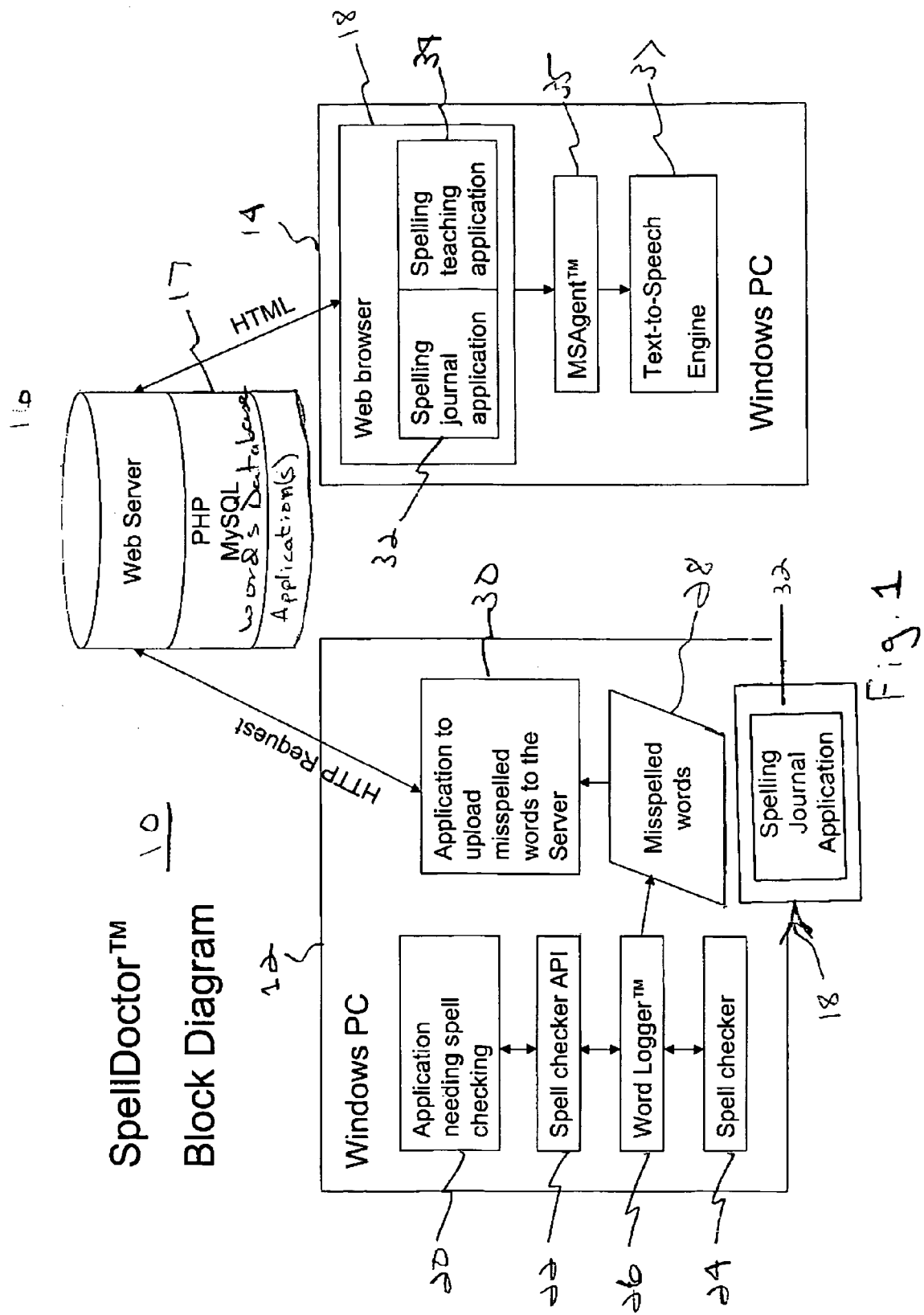
FIG. 1 is a block diagram of the system according to one aspect of the present invention.

The system 10, FIG. 1, according to the present invention, provides a spell checker based spelling teaching tool and spelling journal creator. The system 10 includes one or more components loaded on a users PC 12, and an optional component or components loaded on the same or a second PC 14 which may be used by a parent, teacher or other entity to assist in the teaching of misspelled words.

The present invention also includes a Web server 16 which serves to store a words database 17, and to present the words to one or more applications 32/34 running on a Web browser 18 of PC 12 or 14. The words database 17 is posted on the Web server 16 and provides each school or organization with its own database. Each database is a complete record of each student's spelling errors organized by session and date, teacher and class. Error or incidents for each spelling error is also tracked and entered into the database. If there are additional teacher provided words based on either curriculum or out of curriculum based spelling words which are to be learned, these words are also entered and tested on a weekly basis. The preset list is managed by the database and organized into class and associated with weekly dates. As students work through the spelling instruction, practice and test activities, any misspelled test words are placed into the database "error pool" and may then be reviewed and retested at specified intervals.

In accordance with the preferred embodiment of the present invention, the user PC 12 runs an application 20 such as a word processor, e-mail program, presentation program, spread sheet program, web site designer or the like (hereinafter "application program") in which during use, the user is engaged in the act of authentic writing. Authentic writing comprises writing in which the user him or her self chooses the words used in the writing and which are acted upon by a spell checking computer program. A spell checker API 22 is in place between the application program 20 and the standard spell checker 24. As one of ordinary skill in the art will know and understand, this is not a limitation of the present invention as the application program 20 need not run on the user's PC 12 but rather, may be run on a remote server, over the internet, or the like According to the present invention, one component of the invention is a word logger 26 which intercepts reports of misspelled words from the spell checker 24 to the spell checker API 22 and logs them into a misspelled word database 28. One embodiment of the present invention contemplates that the word logger 26 will be an applet loaded on the PC 12 although this is not a limitation of the invention. Also provided is an application 30 as part of the present invention, which will upload the misspelled words 28 to the server 16 either automatically or upon demand/request by the server or a parent or teacher.

Upon demand by an instructor or supervisor such as a teacher or parent at a second PC 14 (or at the first PC 12 at a time different from the initial user), applications such as a spelling Journal application 32 or spelling teaching application 34, as will be explained in greater detail below, run in a Web browser 18 and utilize the list of misspelled words 28 to provide unique teaching methodologies, situations and spelling Journal applications using the misspelled words created by a user.

Although shown operating on two separate PCs, the various teaching applications 32, 34 may in fact be resident on the first PC 12 in the case of the user who wants to use the present invention to teach him or herself misspelled words or alternatively, in the case were a parent or teacher and student utilize the same computer.

The present invention also makes use of two generally available software components including MSAgent 35 available from Microsoft Corp. and a text-to-speech engine 37. MSAgent 35 also provides and facilitates the use of one or more wizard characters such as "Merlin" or "Peedy". In the preferred embodiment, the text-to-speech engine is the Tru-Voice American English text-to-speech engine provided by Learnout & Hauspie although this is not a limitation of the present invention as any similarly functioning text to speech engine will suffice.

Figure 2:
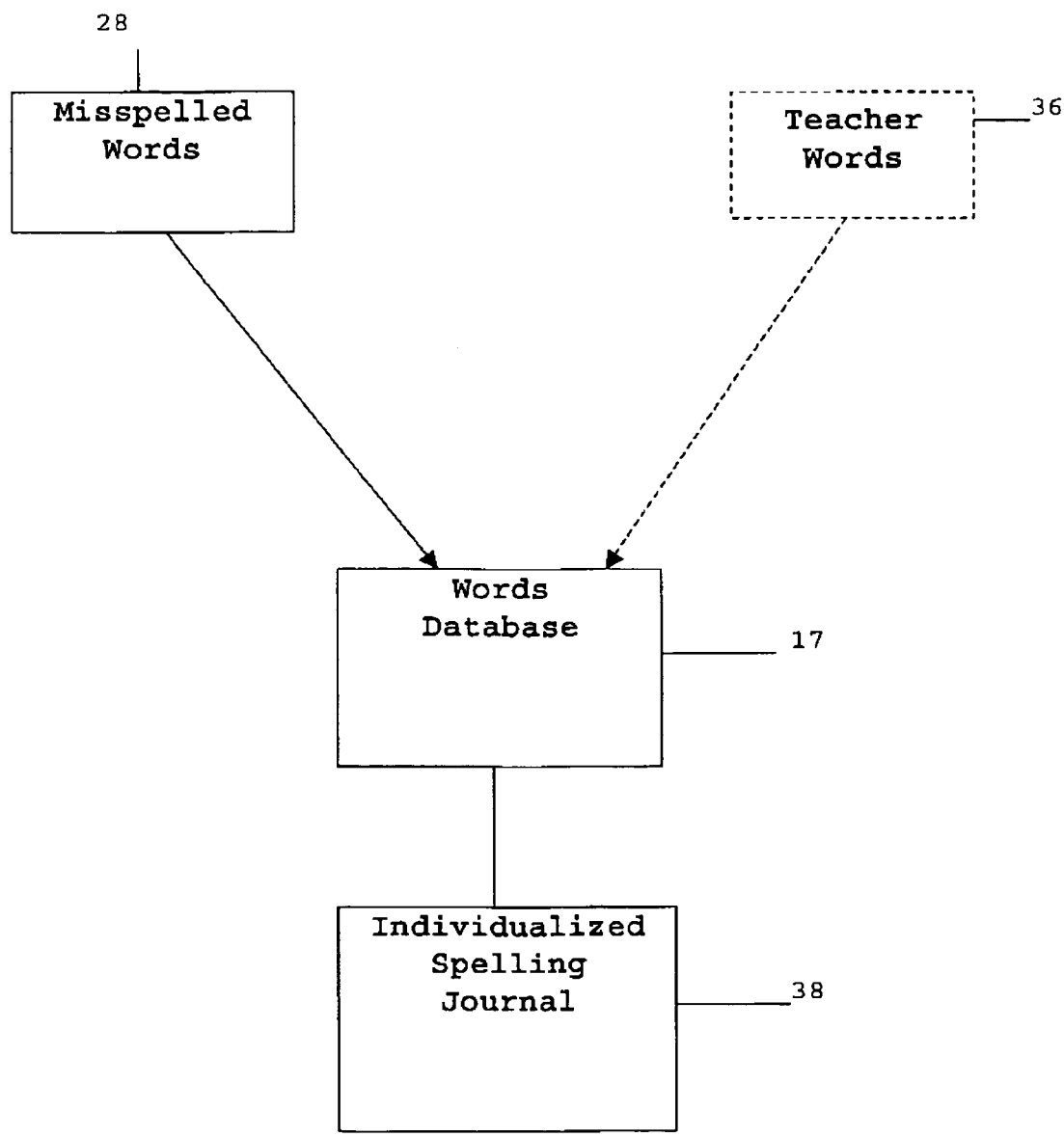
FIG. 2 is a block diagram of how words are funneled into the word database and ultimately an individual's spelling Journal according to one feature of the present invention.

All words assigned to each student, whether captured by the word logger 26 application during a writing assignment and stored as misspelled words 28, FIG. 2, or assigned as part of a curriculum or noncurriculum based spelling list provided by the teacher 36, are added to the word database 17 and ultimately to the individualized spelling Journal 38 which is part of the words database 17. Students, teachers and parents may review the spelling Journal 38 at any time, focusing on all the words they have studied or just those words with high error incidence or words misspelled during test activities.

Figure 3:
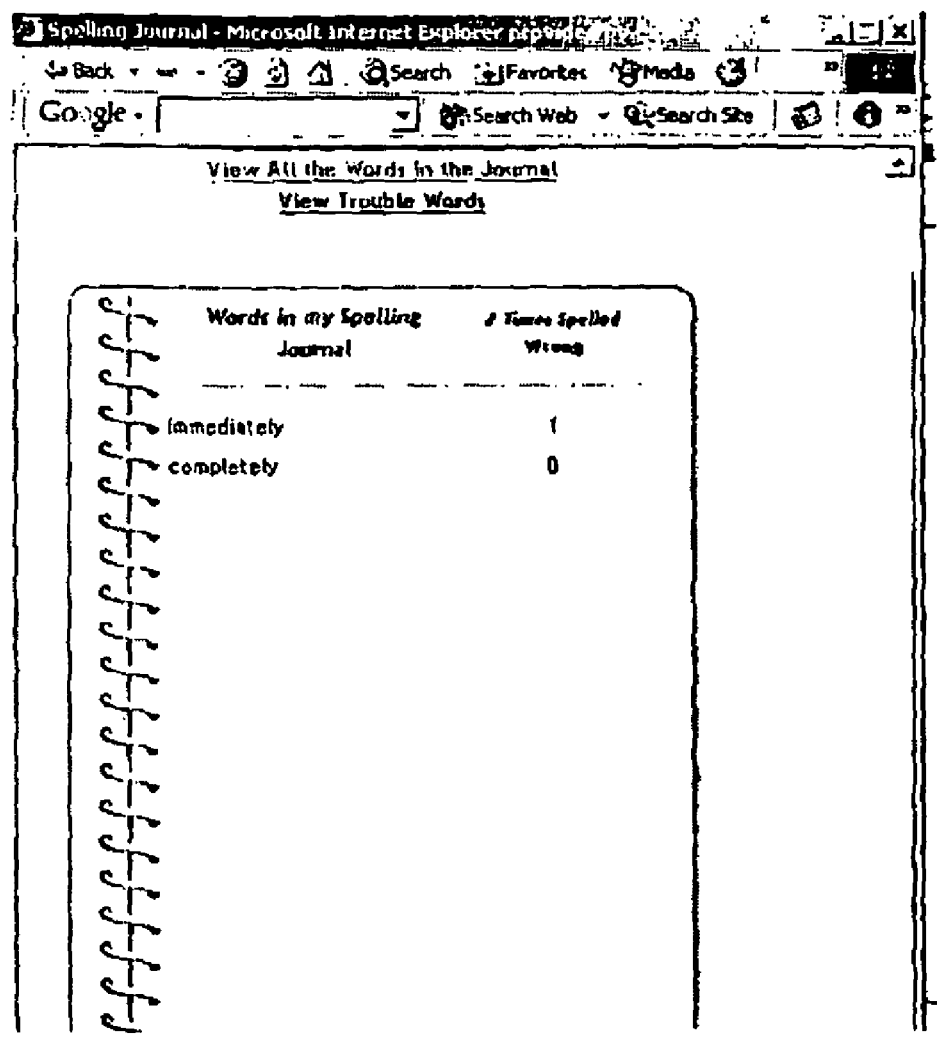
FIG. 3 is a representation of an individual's spelling Journal according to one aspect of the present invention.

An example of an individualized spelling Journal 38 is shown in FIG. 3. The student may review either all of the words in his or her Journal or just those words which are causing the student excessive trouble.

According to the system and method of the present invention, there are two different groups of individuals who can utilize the system and perform various features and functions. These include a student group as well as a teacher or other instructor group.

Figure 4A:
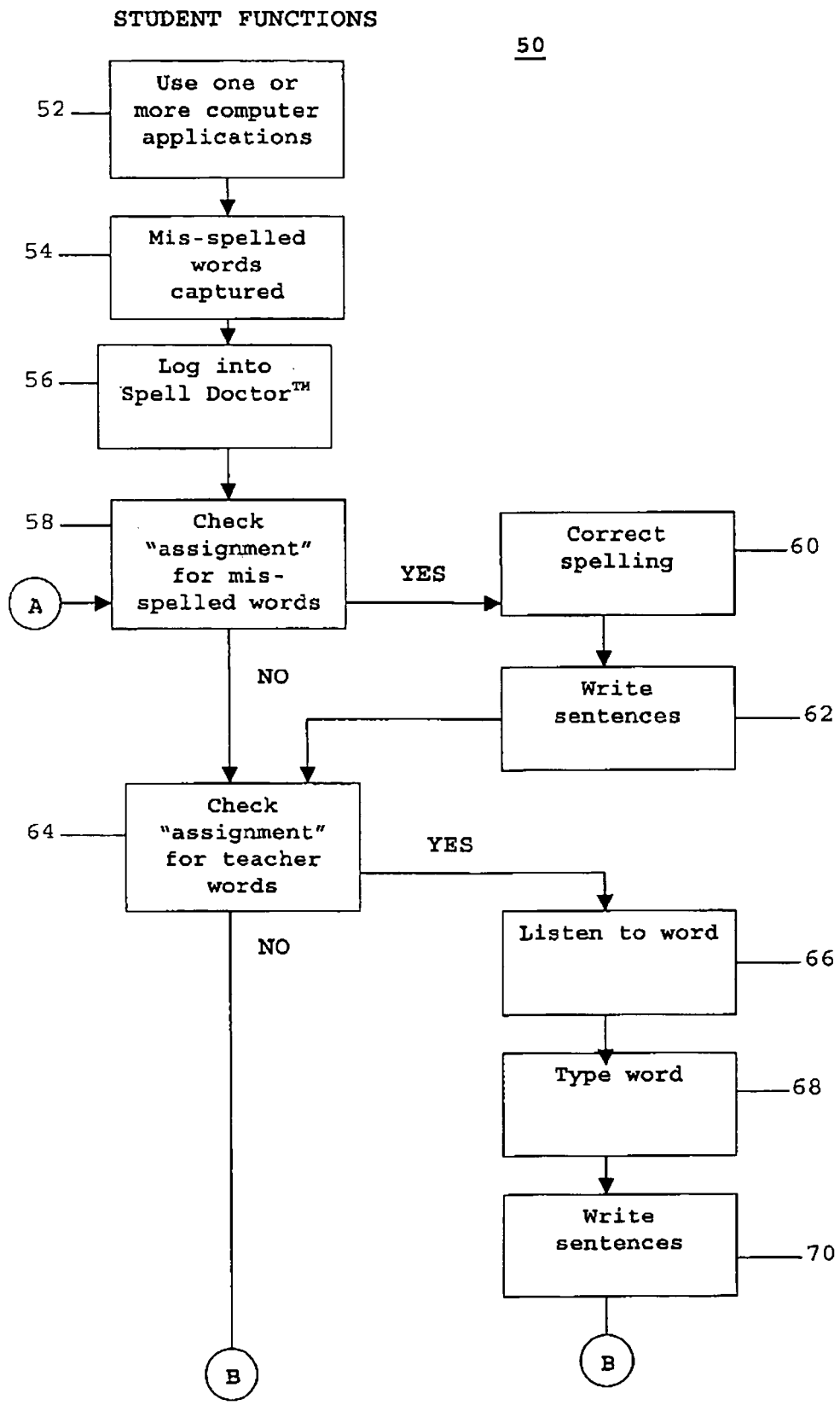
FIGS. 4A and 4B illustrate the functions or actions which a student takes in using the present invention.
Figure 4B:
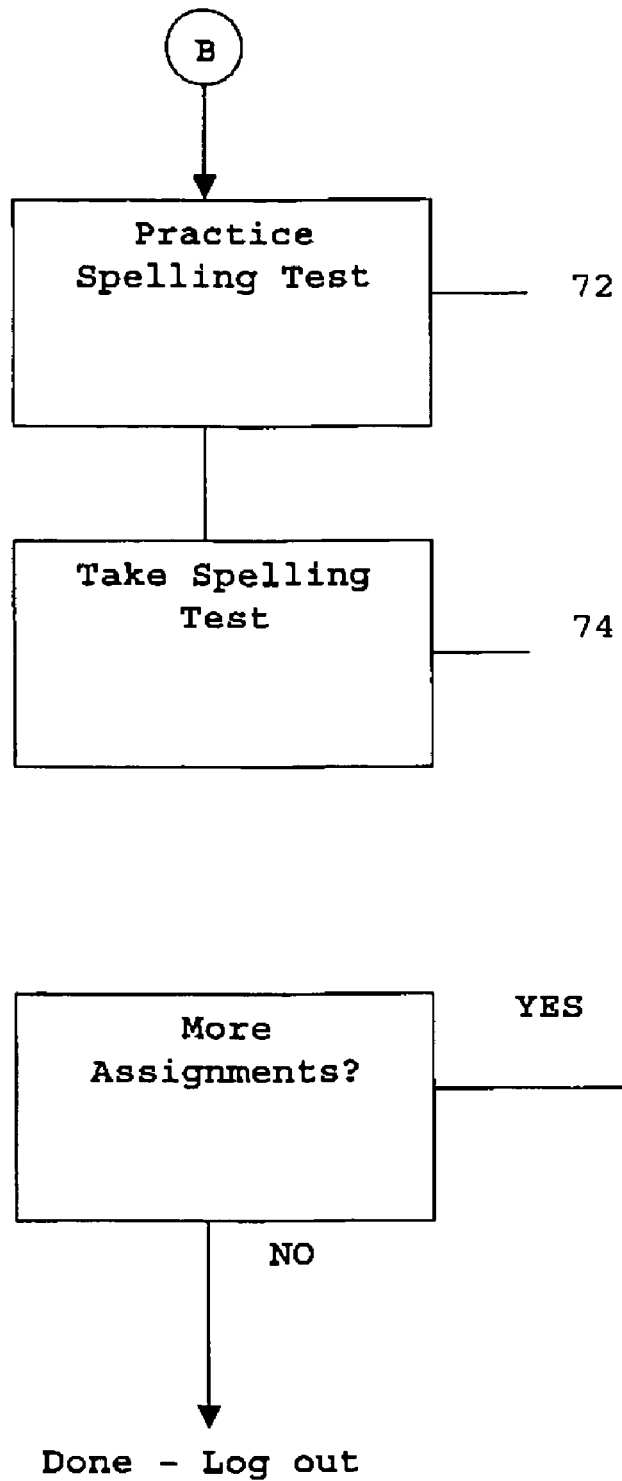

The student function activities are shown in the flow chart 50, FIG. 4 wherein the user begins by utilizing one or more computer applications act 52 and engaging in authentic writing. During this activity, one or more of the user's own misspelled words are captured, act 54, utilizing third-party spell checking software. The applications 52 may include a word processing software, spreadsheet software, or any other type of application software program.

Subsequent to using one or more applications, the user will log on to a web site carrying out the present invention, act 56. This web site is presently called "spelldoctor.com". The student will next check his or her list of assignments typically beginning with misspelled words, act 58. It is to be noted that the student need not begin with checking misspelled words, and that this is not a limitation of the present invention. If there are misspelled words to correct, the student next proceeds to type the word correctly, act 60 and will then be asked to write a sentence utilizing the misspelled word, and perform exercises as assigned by instructor, act 62. The retyping of the misspelled word correctly, and the use of the word in a sentence and the performance of exercise will ensure the teacher or other reviewer that the student can spell the word correctly and understands the proper meaning of the word.

The student will next check his or her assignment monitor for teacher introduced words, act 64. Teacher introduced words may include specific spelling words (often called curriculum based words) and/or cross curriculum based words which are words from other subjects which one or more teachers believe are worth assigning to the student as a spelling word. For example, a math, science or social studies teacher may decide to assign one or more words from their specific curriculum to the student as a spelling word. If they have done so, the student will see this assignment at act 64.

Utilizing the text to speech engine 37 which is utilized as part of the present invention, the spelling Journal application 32 which the student is running will cause one of the wizards to speak the teacher assigned word to the student. The student will listen to the word, act 66 and will be asked to type the word, act 68 followed by preparing a sentence using the word, and performing exercises as assigned by the teacher, act 70.

The student will next have the opportunity to take a practice spelling test, act 72. The practice spelling test will include all of the words in the student's current spelling lesson namely, misspelled words, curriculum based words and cross curriculum based words. The practice spelling test section may also include a check of misspelled words against one or more rules or strategies, each containing one or more words which the student has already reviewed and studied according to the rule or strategy.

For example, the student may have already studied the rule concerning the proper spelling of words including the letters "i" and "e" together. The teacher can assign the "I before e rule" to one or more students. The words belonging to this rule are previously inserted into the database by the system administrator or by the teacher. If a student to whom this rule has been assigned misspells a word in one or more "rules", the system will "speak" or otherwise display to the student the fact that this word is part of a rule or strategy that the student has previously studied, will speak or otherwise display the rule, and ask the student to attempt to correct the spelling of the misspelled word.

The system may also utilize, as a substitute to a "rule" for words that do not have a rule, the concept of the word's "root". The system will have a "root cellar" and once a word assigned to the root cellar is misspelled, one of the system wizards may say to the effect of "you know Johnny, we need to take a trip down to the root cellar" wherein the system would display a cellar or cave like atmosphere and a description/tutorial concerning the word's "root" would be provided.

After taking the practice spelling test, the student will have the opportunity to take the real spelling test, act 74. After taking the real spelling test, the student may return to his or her assignment posting to see if there are more assignments to review. If not, the student is done with the spelling program and may log out.

FIG. 5 is an illustration of an exemplary computer screen shot of one embodiment of the invention which depicts what the student sees upon logging into the spelling Journal application. In addition to being able to correct misspelled words, deal with assigned spelling words, taking a practice spelling test and the final spelling test, the student will also see the "status" of his or her assignments that is, whether the assignments have been completed or not. In addition, there may be various spelling lessons that the student can review as well as going back to review his or her spelling Journal.

Figure 6:
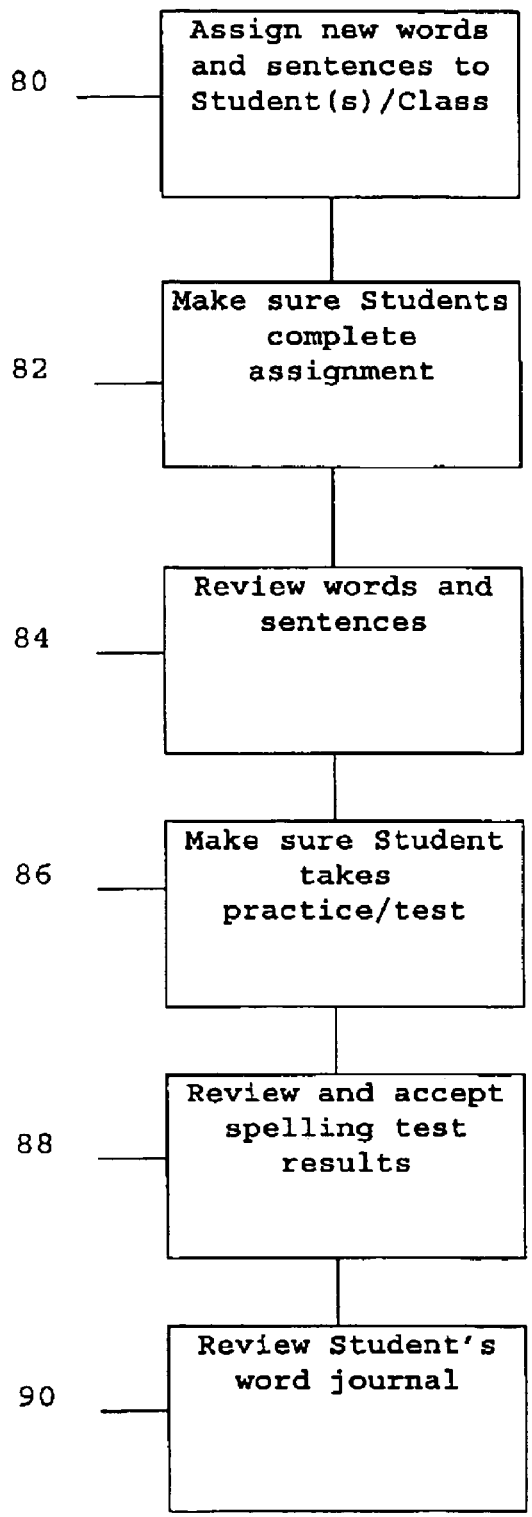
FIG. 6 is a flow chart illustrating the functions or actions which a teacher takes in using the system and method according to the present invention.

As previously mentioned, a second type of user namely an instructor, teacher or parent is able to use the system and method of the present invention by utilizing the "teacher" application 34. The functions which a teacher or instructor may perform are illustrated in FIG. 6 beginning with the act of assigning new words and sentences to selected students or selected classes. The program allows a teacher or other instructor to assign words to individual students or to all students in a given class. The word database keeps track of each and every student and each and every class assigned to the teacher or instructor.

The teaching application 34 also allows the teacher to create a unique assignment for each student, make sure that the students complete all assignments, act 82, as well as to review words and sentences which the students create as part of their assignment, act 84. The teacher must also make sure that the student takes the practice and/or full spelling test, act 86 and must review and except the spelling test results, act 88 finally, the present invention allows the teacher or other instructor to review the students were Journal, act 90.

FIG. 7 is an illustration of an exemplary computer screen shot of one embodiment of the invention which depicts what the teacher sees upon logging into the teaching application 34. What is illustrated is all of the students in one class. The teacher may select a different class and may add new words, add its curriculum or cross curriculum sentences and change class memberships and defaults. The screen also shows how visually, the teacher is alerted to his or her new tasks based upon when the students complete their assignments. The words "to do" alert the teacher to the fact that they must check on either the progress of a particular student assignment or the need to assign another assignment or activity. The teacher need only click on the "to do" word to bring the teacher to that particular student's task to be reviewed or assigned. The word "waiting" indicates that the student has not yet completed that task and the teacher need not yet review it. In this manner, the teacher or instructor may also contact the student if he or she is not performing the assignments or if the assignments are being performed in an unsatisfactory condition. The teacher may reintroduce words that the teacher believes the student does not completely understand or cannot spell correctly on a consistent basis.

Accordingly, the present invention provides a novel spelling instruction system and method which, utilizing a computer and computer program, allows a user's misspelled words from his or her own authentic writing, as well as an instructor's curriculum or cross curriculum words, to be added to a spelling Journal which is used to create various assignments, exercises and tests in order to teach a student proper spelling and proper use of words in his or her Journal.

It is important to note that the present invention is not intended to be limited to a device or method which must satisfy one or more of any stated or implied objects, embodiments or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by any allowed claims which may flow from this application and their equivalents.

The invention claimed is:

1. A method for providing an individualized spelling assignment containing words to be taught to a user using an automated computer program, the method comprising:
   receiving, from a spell checking computer software program, one or more words that a computer user has misspelled while using a computer software application; and
   responsive to said misspelled words, automatically creating at least one computerized individualized teaching assignment, accessed by said user utilizing a computer system, for reinforcing proper spelling and usage of said one or more misspelled words.

2. The method of claim 1, further including, after receiving said one or more misspelled words, storing said one or more misspelled words in a misspelled word database.

3. The method of claim 1, further including providing a word logger, responsive to said spellchecking computer software program, for receiving the misspelled words which the spellchecking computer software program identifies and for storing the misspelled words in a misspelled words database.

4. The method of claim 1, further including providing an application software program, responsive to said misspelled words database, for transferring said misspelled words from said misspelled words database to said word database.

5. The method of claim 1, wherein said word database is located on a remote server.

6. The method of claim 1, further including providing a spelling journal application software program, operable by the user, to provide access to said computerized individualized teaching assignment generated in response to said one or more misspelled words.

7. The method of claim 1, further including a spelling teacher application software program, for allowing a teacher or instructor to add non misspelled words to said word database.

8. The method of claim 7, wherein said non misspelled words include curriculum based words and cross-curriculum based words.

9. The method of claim 7, wherein said non misspelled words entered by said teacher further include a sentence showing proper usage of said non misspelled words.

10. The method of claim 9, further including a text-to-speech engine, for converting text to audible speech; and wherein said computerized individualized teaching assignment further includes causing said text-to-speech engine to speak said non misspelled words and corresponding sentences to said user.

11. A method for providing an individualized spelling assignment containing words to be taught to a user using an automated computer program, the method comprising:
   receiving, from a spell checking computer software program, one or more words that a computer user has misspelled while using a computer software application;
   storing said one or more words that a computer user has misspelled in a word database; and
   responsive to at least said misspelled words in said word database, automatically creating at least one computerized individualized teaching assignment, accessed by said user utilizing a computer system, for reinforcing proper spelling and usage of said one or more misspelled words.

12. A method for providing an individualized spelling assignment containing words to be taught to a user using an automated computer program, the method comprising:
   receiving from a spell checking computer software program one or more words that a computer user has misspelled while using a computer software application;
   receiving from a teacher or instructor non misspelled words to be inserted into said individualized spelling assignment;
   storing said one or more misspelled words and non misspelled words in a word database; and
   responsive to said one or more misspelled words and said one or more non misspelled words, automatically creating at least one computerized individualized teaching assignment, accessed by said user utilizing a computer system, for reinforcing proper spelling and usage of said one or more misspelled words and said one or more non-misspelled words.

13. An automated system for providing individualized spelling assignments to be taught to a user, said automated system including a computer program embodied on a computer readable medium for use with a computer including a processor that is configured to allow a user to run a computer application, said computer program comprising:
   a word logger, for receiving from a spell checking computer software program, one or more words that a computer user has misspelled while using a computer application program; and
   said automated system further including a spelling journal application software program, embodied on a computer readable medium, and responsive to said one or more misspelled words, for automatically creating at least one individualized spelling assignment to be accessed by said user, said individualized spelling assignment for reinforcing proper spelling and usage of said one or more misspelled words.

14. The system in claim 13, further including a misspelled words database, coupled to said word logger, for storing said one or more misspelled words 15. The system in claim 14, further including a word database, for storing said one or more misspelled words and for storing teacher assigned words.

16. The system of claim 15, wherein said teacher assigned words include curriculum words and cross-curriculum words.

17. The system of claim 15, wherein said teacher assigned words includes sentences utilizing the words entered by said teacher.

18. The system of claim 17, further including a text to speech engine, for converting said teacher assigned words and sentences into spoken words and sentences.

19. The system of claim 18, wherein said spelling journal application allows said user to access said spoken words and sentences during the user's individualized spelling assignment.

20. The system of claim 15, further including a spelling journal application program, for allowing said user to access said individualized spelling assignment based on said user's misspelled words and said teacher assigned words.

21. The system of claim 13, further including a spelling journal application program, operative on a computer system, for allowing said user to access said individualized spelling assignment based on said user's misspelled words.

* * * * *